Dec. 12, 1939.    R. V. TERRY    2,182,974
HYDRAULIC TURBINE
Filed Dec. 10, 1937    3 Sheets-Sheet 1

INVENTOR.
Roger V. Terry
BY
Donald W. Robertson
his ATTORNEY

Dec. 12, 1939.  R. V. TERRY  2,182,974
HYDRAULIC TURBINE
Filed Dec. 10, 1937  3 Sheets-Sheet 2

INVENTOR.
Roger V. Terry
BY
Donald W. Robertson
his ATTORNEY

Dec. 12, 1939.     R. V. TERRY     2,182,974
HYDRAULIC TURBINE
Filed Dec. 10, 1937     3 Sheets-Sheet 3
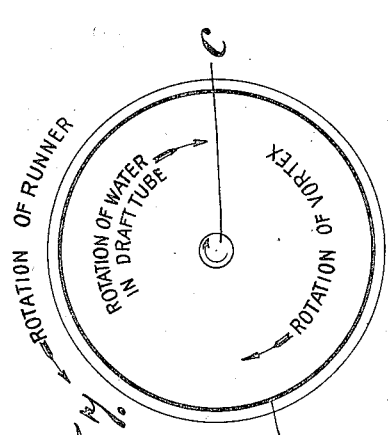
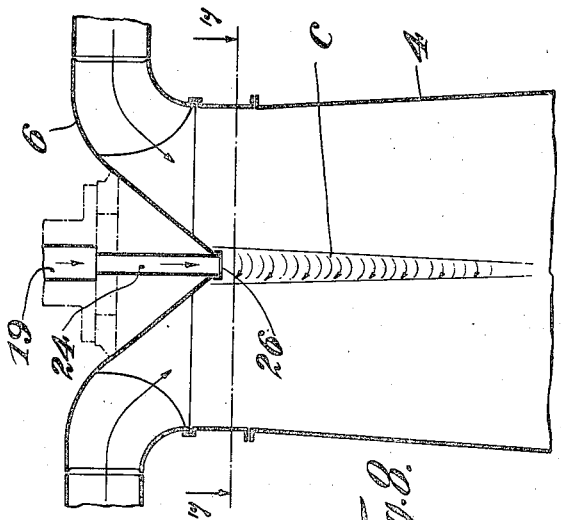
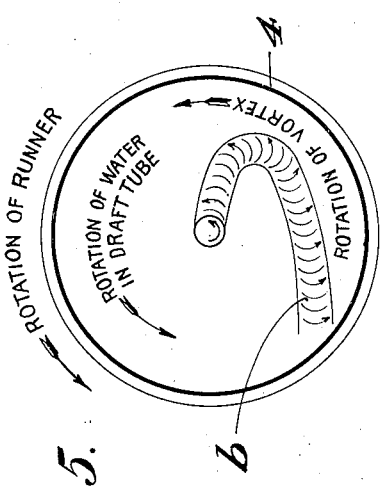
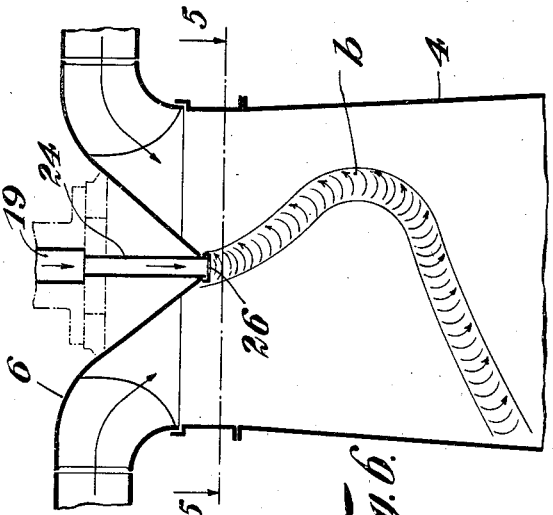
INVENTOR.
Roger V. Terry
BY Donald W. Robertson
his ATTORNEY Patented Dec. 12, 1939

2,182,974

UNITED STATES PATENT OFFICE 2,182,974

HYDRAULIC TURBINE

Roger V. Terry, Hilton Village, Va., assignor to Newport News Shipbuilding and Dry Dock Company, Newport News, Va., a corporation of Virginia Application December 10, 1937, Serial No. 179,077

14 Claims. (Cl. 253—117)

The invention relates to hydraulic turbines, and particularly to turbines having runners of the fixed blade type.

A fixed blade hydraulic turbine having adjustable wicket gates, when operating under a constant head and driving an electric generator at uniform speed, is subject to vibration produced as a result of disturbances in the flow of water thru the runner and draft tube. In such a turbine there is generally only one particular gate adjustment at which the water will be delivered to the draft tube without being caused to whirl around the axis of the turbine. When the gate adjustment is changed so as to provide a larger or smaller opening than that represented by this critical adjustment, the water is delivered to the draft tube in a whirling stream. The gate opening at which the water is delivered to the draft tube without whirl is usually at, or slightly above, the gate opening which produces the highest efficiency. Under constant speed the gate opening which produces no whirl in the draft tube varies with the head, this opening increasing as the head is reduced. Thus, for each head there is a corresponding gate opening commonly referred to as the "no whirl gate" which produces no whirl in the draft tube.

At gate openings somewhat below the no whirl gate the water leaves the runner and enters the draft tube with a whirl in the direction of rotation of the turbine rotor. As this whirling water approaches the axis of the turbine below the runner, the pressure becomes less in accordance with well known vortex laws. When the pressure is reduced to an amount which is equivalent to the vapor pressure of the water an explosion occurs, creating a considerable pressure disturbance which travels throughout the water passages of the draft tube, runner, scroll case and penstock. For a short time after such an explosion occurs there exists below the runner, near the axis of the turbine, a partial void containing water vapor. This void extends downwardly from the end of the runner crown, or fairwater, in the general form of a cork screw and its lower end rotates with the whirling water in the draft tube, being thrown out against the walls of the tube where portions of the void collapse. This collapse creates considerable noise and pressure disturbance and sometimes may even cause considerable damage to parts of the draft tube. The action is very violent. Under some conditions the vortex may disappear or collapse if the gates are moved slightly, or sometimes even if the gates are held stationary. When the vortex collapses the water rushes in to take the place of the vortex core, causing a sudden change in volume or arrangement of the water column which again sets up pressure disturbances. The action may be rhythmic or it may be intermittent. Frequently there results a variation in the power output and speed of the turbine even when the wicket gates are locked in a fixed position. In some cases the pressure disturbances may cause the rotors of the turbine and generator to reciprocate up and down rhythmically or intermittently and sometimes very violently.

At gate openings above the critical no whirl gate a vortex commonly referred to as a "reverse vortex" forms in the draft tube, whirling with the water in the tube in a direction opposite to that in which the runner is rotating. This reverse vortex is more stable, usually stays in the center of the tube and does not create as violent disturbances as those just noted.

The range of gate openings over which there occur such difficulties as I have described varies with the speed and head and also with the type and details of construction of the turbine. The vortex zone below the best gate opening usually covers about 30% of the total range of gate openings. Below this zone the vortex energy is largely dissipated in friction of the water against the walls of the draft tube. A given turbine operating at a given speed and under a given head usually has a range of from 5 to 10% in gate opening over which the disturbances resulting from vortex conditions are severe.

Various attempts have been made in the past to overcome vortex disturbances by venting the draft tube or the runner either by allowing air to be drawn into the tube or runner, or by forcing air thereinto under pressure. Most of these arrangements have introduced complications in the design of the turbine, many of them requiring the provision of automatic means for adjusting the size of the vent openings in accordance with changes in adjustment of the openings in the turbine gates. Others are inoperative when the tail water level is above the turbine runner unless provision is made for introducing air under pressure, which requires the provision of auxiliary apparatus. Still others involve the use of a vent pipe extending into the draft tube. Such constructions involve mechanical difficulties which generally have prevented their adoption. The high velocity of the water in the draft tube, and particularly the terrific lashing forces set up by the rotating vortex, make it difficult to provide sufficient mechanical strength in such a projecting tube without making it of such a size, or bracing it with such members, as would interfere unduly with the flow of water in the draft tube. In every case such a venting arrangement offers considerable resistance to the water flow and a consequent loss in efficiency.

It is an object of my invention to provide an improved turbine venting arrangement which will be effective in producing smooth quiet operation of the turbine at all gate openings. A further object is to provide a turbine construction which will eliminate, or at least greatly reduce, vibration resulting from vortex disturbances occurring above or below the no whirl gate opening. A more specific object is to provide a simple means for venting the vortex zone of a turbine with atmospheric air under all conditions where a vortex occurs, irrespective of the tail water level. It is also an object of my invention to provide venting means which can be applied to conventional turbine construction without incurring any fundamental changes in design, and without necessitating the provision of auxiliary pumping or vent-adjusting mechanism. Other objects and advantages will appear as the description proceeds.

I have found that if means are provided for admitting air, or other gaseous fluid, to the draft tube of a turbine at a point coinciding with the axis of the rotor, the turbine will operate much more quickly. Moreover, the vortex explosions are cushioned and pressure disturbances virtually eliminated, or at least greatly reduced. Speed and power changes are also largely eliminated. As a result of this there is usually also an improvement in efficiency. I have found further that the location of the point at which the air is admitted to the draft tube is of particular significance. This point should be located in line with the axis of the turbine where the converging sides of the runner crown or fairwater come together at the entrance of the draft tube. By so locating the point of admission of the air, i. e., the air outlet port, I have found that greater efficiency is attained than is possible by locating the port at any point removed from the axis.

I shall now describe my invention with respect to the specific embodiment which has been selected for purposes of illustration and which is shown in the accompanying drawings. In the drawings:

Fig. 1 is a vertical sectional view of the essential parts of a turbine embodying my invention. Fig. 2 is a horizontal sectional view thru the turbine shaft taken as indicated at 2—2 in Fig. 1, but to an enlarged scale. Fig. 3 is a fragmentary sectional view, to a greatly enlarged scale, taken on the line 3—3 of Fig. 2 and showing a check valve which may form a part of my novel venting arrangement. Fig. 4 is a horizontal sectional view thru the runner cone or fairwater taken along the line 4—4 of Fig. 1 and showing my central vent tube.

Figs. 5 to 8, inclusive, are diagrammatic views illustrating typical vortex conditions, Figs. 5 and 6 illustrating a typical vortex formed in the draft tube at about 50% gate opening, and Figs. 7 and 8 illustrating a typical vortex formed in the draft tube at about 100% gate opening.

Fig. 5 is a diagrammatic section on the line 5—5 of Fig. 6; and

Fig. 6 represents a vertical section of the runner and draft tube, including a phantom view of the typical vortex ocurring at 50% gate opening.

Fig. 7 is a diagrammatic section on the line 7—7 of Fig. 8; and

Fig. 8 represents a vertical section of the runner and draft tube, with a phantom view of the typical vortex occurring at 100% gate opening.

Figure 1:
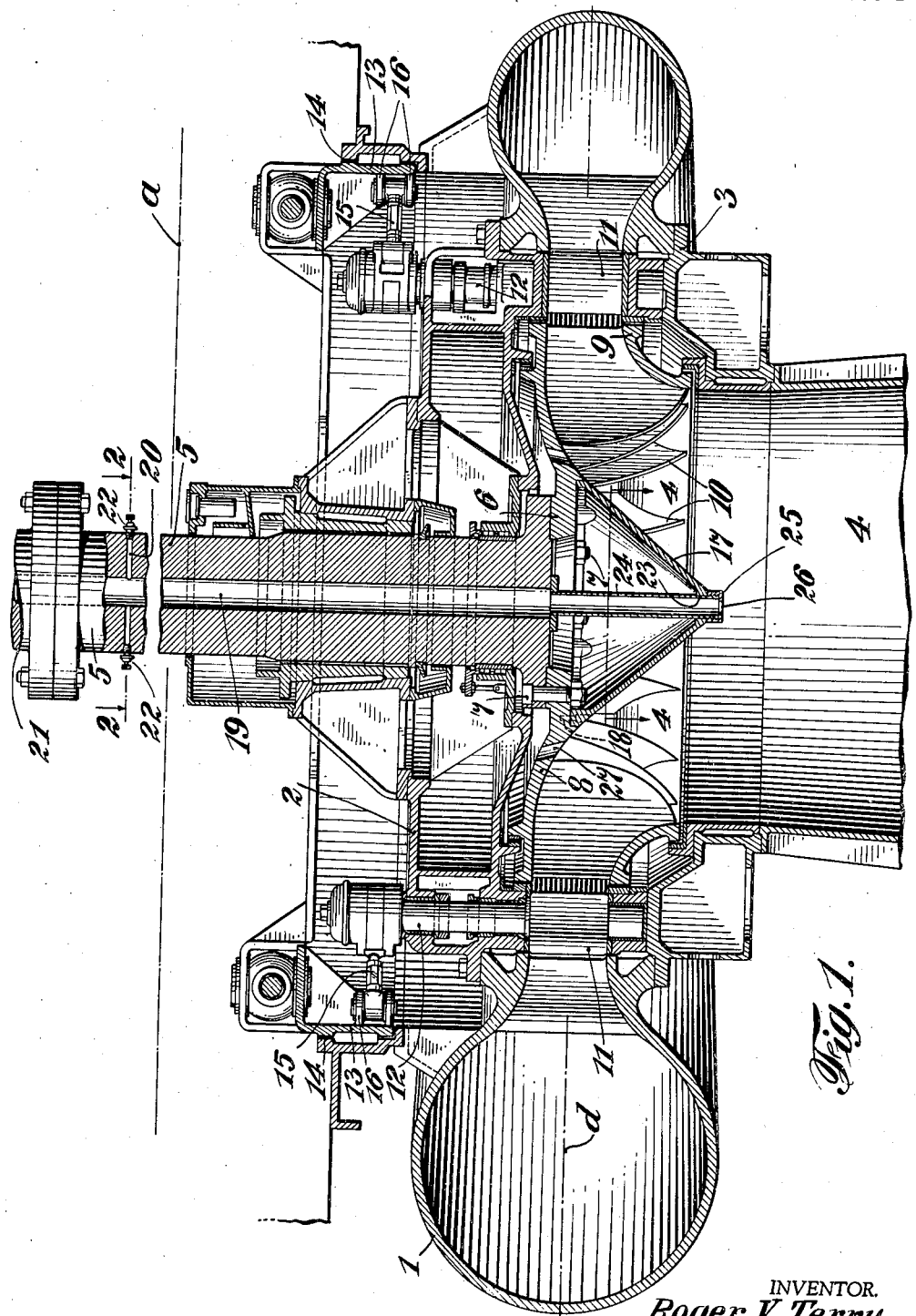
Figure 2:
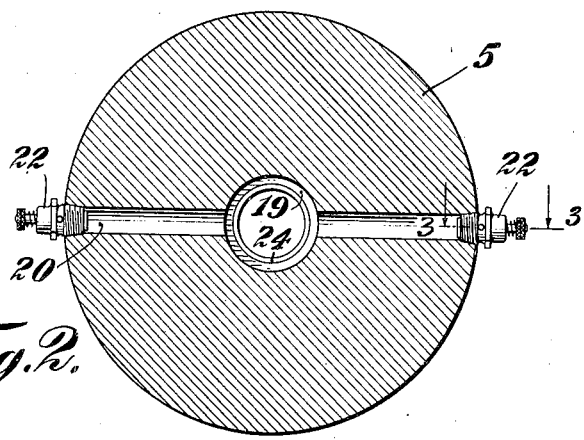

Referring to Fig. 1, there is shown a turbine comprising a scroll casing 1, to which is secured a cover plate or head casing 2 and a bottom casing 3. Connected to the bottom casing 3 is a discharge conduit or draft tube 4. Journaled in a bearing supported by the head casing 2 and associated structure is a shaft 5 which is the main shaft of the turbine and to which at the lower end is connected the turbine rotor 6 in any convenient manner, as by the bolts 7. The runner section provided by the rotor 6 comprises a crown 8, rim section 9, and blades 10 extending between the crown and rim. Between the scroll casing 1 and the periphery of the runner are wicket gates 11 mounted on shafts 12 to provide an adjustable gate opening. The adjustment of the wicket gates 11 may be controlled in any manner known to those skilled in turbine design. Ordinarily they are arranged for operation by a shifting ring 13 which in the construction shown is journaled in a bearing 14 provided in the head casing 2. The ring 13 is connected to members secured to the shaft 12 by means of links 15, each of which has a pivotal engagement with lugs 16 formed on the inside of the ring 13. With this arrangement shifting of the ring 13 produces a uniform change in the adjustment of each of the wicket gates 11. Any convenient means responsive to the turbine governor may be provided for controlling the movements of the ring 13, and since such means are well known to the art they will not be described. It will be understood that other suitable gate actuating mechanism may be substituted for that which I have selected for purposes of illustration; also that the rotor 6 may be of any conventional construction used in connection with runners of the Francis or propeller type.

The downwardly extending sides of the crown 8 of the runner converge at the axis of the turbine shaft 5. In the construction shown the central portion of the runner crown 8 is provided by a separate member, the fairwater 17, which is preferably conical in form. This fairwater or runner cone 17 is secured to the underside of the crown 8 in any convenient manner as by means of the bolts 18.

The turbine shaft 5 is provided with an axially extending passage 19 and a transverse passage 20 communicating therewith. The transverse passage 20 preferably is located above the normal maximum tail water level. Thus, if the normal maximum tail water obtaining with the installation illustrated in Fig. 1 be considered to be at the level indicated by the dot-dash line a, then the passage 20 should be located at some point above this level. I have found it convenient to locate the transverse passage 20 adjacent the upper end of the turbine shaft 5. If desired, however, it may be located in the generator shaft 21, the passage 19 being extended thereinto. Also if desired the outside entries to the passage 20 may be closed by suitable check valves 22. When such check valves are employed the water will be prevented from backing up thru the shaft into the turbine pit should the tail water level ever rise above the passage 20 by reason of floods or other abnormal conditions.

The apex of the fairwater 17 is provided with an axial aperture 23 to permit air to be drawn into the center of the draft tube 4 thru the passages 19 and 20 and the fairwater 17. I prefer to connect the lower end of the passage 19 in the turbine shaft 5 to the aperture 23 in the fairwater 17 by means of a tubular member 24 which may be secured to the lower end of shaft 5 in any convenient manner, and which may extend thru the aperture 23 so that its threaded lower end is adapted to receive a cap 25 provided with an orifice or port 26. This structure is preferably so designed that the sides of the cap 25 will be flush with the sides of the fairwater 17. Drainage holes 27 extending thru the crown 8 of the runner permit the discharge of any water which leaks thru the top runner seal.

Figure 3:
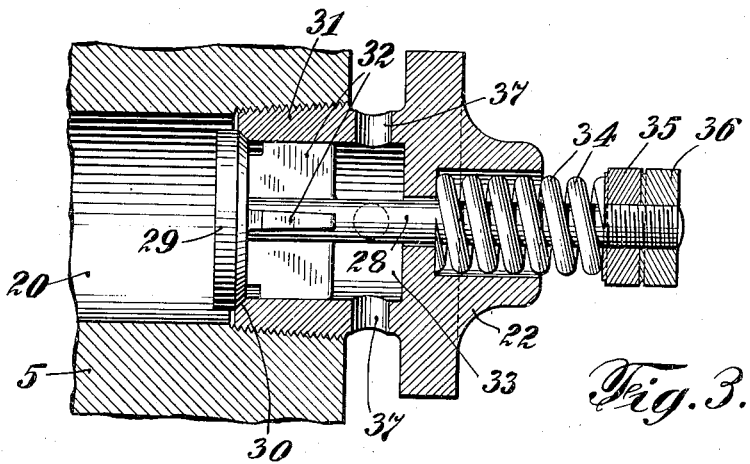
Figure 4:
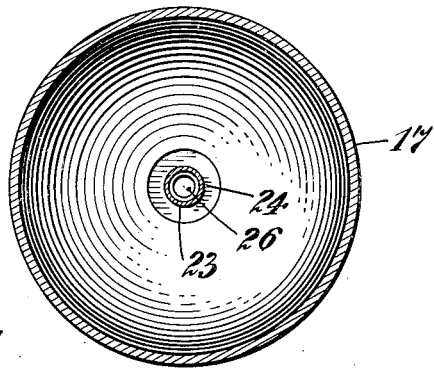

In Fig. 3 I have shown a suitable check valve construction comprising a valve stem 28 carrying a head 29 for engagement with a valve seat 30 at the inner end of the externally threaded plug 31. Radial guides 32 extending from the valve stem 28 guide the head 29 within the central bore 33 of the plug 31. The valve stem 28 extends thru the end wall of the plug 31 and its projecting end is surrounded by a helical spring 34, seating against the end wall of the plug at one end at its other end against a retaining nut 35 threaded on the valve stem 28. The nut 35 may be adjusted to give any desired initial compression to the spring 34 so that air will be drawn thru the valve into the passage 20 only upon the creation of a predetermined pressure differential. A lock nut 36 is provided in order to maintain the adjustment. A series of apertures 37 afford entry ports to the bore 33 of the valve. It will be understood that any number of radial passages, such as 20, may be provided for venting the passage 19 to the atmosphere and each venting passage may be provided with a check valve similar in function and purpose to that illustrated in Fig. 3.

The operation of a turbine embodying my invention is further explained by Figs. 5 to 8 of the drawings. A typical vortex obtained at about 50% gate opening is shown in Figs. 5 and 6. As viewed in Fig. 5, with the runner rotating in a counter-clockwise direction we find that the direction of rotation of the water in the draft tube, as well as the direction of rotation of the vortex, is counter-clockwise. The partial void represented by the vortex b induces the flow of air thru the passage 19 of the turbine shaft and the tubular connection 24, equalizing the pressure and preventing the collapse of the vortex.

Figs. 7 and 8 illustrate a typical vortex c that forms in the draft tube at about 100% gate opening. As viewed in Fig. 7, the direction of rotation of the runner being counter-clockwise as before, we find that the water in the draft tube, and the vortex, rotate in a clockwise direction. The vortex c is generally referred to as a reverse vortex. As in the previous illustration, the partial void represented by the vortex c induces the flow of air through the passage 19 of the turbine shaft and tubular connection 24, equalizing the pressure and preventing collapse of the vortex.

The amount of air drawn thru the port 26 depends upon the pressure differential and the size of the port. Where check valves are employed it depends also upon the initial pressure differential required to operate the valve. It will be seen that in every case the action is entirely automatic and requires no connection to the turbine gate operating mechanism or governor. The port 26 is made just large enough to admit sufficient air to create stable operation. According to my observation this amount of air is ordinarily from ½ to 1½% by volume of the water flowing thru the turbine at full gate.

In order that my invention may be better understood I shall refer now to a specific example of its application to a turbine operating under a head of 455 feet and with a tail water level 7 feet above the center line d of the runner (Fig. 1). When the gate opening reaches about 25%, air will start entering the draft tube thru the passages in the shaft and fairwater. The maximum vacuum at the apex of the fairwater will occur when the wickets are adjusted to about 50% gate. Above this gate opening the quantity of air drawn into the vortex will become less, until a gate opening of about 85% is reached. At 85% gate the water leaves the runner without whirling, no vortex is formed and therefore no air is drawn in. Above a gate opening of about 85% the reverse vortex forms (Figs. 7 and 8), and air is again drawn thru the passages in the shaft and fairwater, this condition obtaining up to 100% gate opening. The air which is drawn in mixes with the water and the water vapor, forming a cushion which largely eliminates the detrimental effects of the vortex irrespective of the tail water level. If the tail water level is sufficiently low a small amount of air will be drawn in at all gate openings. This action is not objectionable but rather is generally found to result in some improvement in efficiency over the greater part of the range of gate openings.

According to my invention the air is admitted to the draft tube at the particular point which contributes most to the efficiency and which is most effective in eliminating explosive disturbances and vibration. The point of admission is at the axis of the turbine where the vortex forms in the center of the draft tube immediately downstream from the center of the runner crown, or apex of the fairwater. This is the point of lowest pressure when the whirling water forms a vortex and its location is critical wtih respect to the attainment of the maximum cushioning of vortex disturbances.

The advantages of my invention may be obtained with constructions differing in many particulars from that which I have specifically described. For example, the amount of air admitted to the vortex may be governed by the size of the passages in the turbine shaft or fairwater, or by the size of the passages in the check valves, rather than by the size of the port 26. The port 26 may be formed by a screen or other foraminous body.

Throughout the description, the terms and expressions which I have used are employed as terms of description and not of limitation, and I have no intention of excluding any equivalents or minor variations of the invention shown and described.

I claim:

1. In an hydraulic turbine, a rotor, means for delivering water to said rotor under pressure, a discharge conduit for carrying water away from said rotor, and means associated with said rotor for admitting a gaseous fluid to said discharge conduit, the point of admission of the gaseous fluid being located at the center of said discharge conduit.

2. In an hydraulic turbine, a rotor, means for delivering water to said rotor under pressure, a discharge conduit for carrying water away from said rotor, and means associated with said rotor for admitting a gaseous fluid to the discharge conduit, said last-named means comprising a port through which said fluid enters said discharge conduit, said port arranged at the axis of said rotor.

3. In an hydraulic turbine, a rotor, means for delivering water to said rotor under pressure, a discharge conduit for carrying water away from said rotor, and means associated with said rotor for admitting a gaseous fluid to said discharge conduit, the point of admission of the gaseous fluid to the discharge conduit being located at the point of minimum pressure therein.

4. In an hydraulic turbine, a rotor, means for delivering water to said rotor under pressure, a discharge conduit for carrying water away from said rotor, and means associated with said rotor for admitting a gaseous fluid to the discharge conduit, said last-named means comprising a port through which said fluid enters said discharge conduit, said port arranged at the point of minimum pressure in said conduit.

5. In an hydraulic turbine, a rotor, a rotor shaft, means for delivering water to said rotor under pressure, a discharge conduit for carrying water away from said rotor, and means associated with said rotor for admitting a gaseous fluid to said discharge conduit, said last-named means comprising an aperture extending axially of said rotor shaft, said aperture being vented at a point above maximum tail water level.

6. In an hydraulic turbine, a rotor, a rotor shaft, means for delivering water to said rotor under pressure, a discharge conduit for carrying water away from said rotor, and means associated with said rotor for admitting a gaseous fluid to said discharge conduit, said last-named means comprising a port through which said fluid enters said discharge conduit, said port arranged at the axis of said rotor, and an aperture in said rotor shaft in communication with said port arranged to deliver said fluid thereto.

7. In an hydraulic turbine, a rotor, a rotor shaft, means for delivering water to said rotor under pressure, a discharge conduit for carrying water away from said rotor, and means associated with said rotor for admitting a gaseous fluid to said discharge conduit, said last-named means comprising a port through which said fluid enters said discharge conduit, said port arranged at the axis of said rotor, and an aperture in said rotor shaft in communication with said port, said aperture being vented at a point above maximum tail water level.

8. In an hydraulic turbine, a rotor, a rotor shaft having an aperture extending axially thereof, means for delivering water to said rotor under pressure, a discharge conduit for carrying water away from said rotor, means for admitting air to said shaft aperture, and an apertured member in communication with said shaft aperture arranged to discharge air into said conduit at the axis of said rotor.

9. In an hydraulic turbine, a rotor, a rotor shaft having an aperture extending axially thereof, and a transverse aperture connecting said axial aperture to the atmosphere at a point above maximum tail water level, means for delivering water to said rotor under pressure, a discharge conduit for carrying water away from said rotor, and an apertured member in communication with said shaft aperture arranged to discharge air into said conduit at the axis of said rotor.

10. In an hydraulic turbine, a rotor, a rotor shaft having an aperture extending axially thereof, and vented to the atmosphere through a check valve, means for delivering water to said rotor under pressure, a discharge conduit for carrying water away from said rotor, and an apertured member in communication with said shaft aperture arranged to discharge air into said conduit at the axis of said rotor.

11. In an hydraulic turbine, a rotor, a rotor shaft having an aperture extending axially thereof, means for delivering water to said rotor under pressure, a discharge conduit for carrying water away from said rotor, said rotor having a crown extending downwardly toward said discharge conduit and having its terminus at the axis of the rotor, and a port at said terminus, said aperture in the shaft arranged in communication with said port for discharging air therethrough into said conduit.

12. In an hydraulic turbine, a rotor, a rotor shaft having an aperture extending axially thereof, means for delivering water to said rotor under pressure, a discharge conduit for carrying water away from said rotor, a fairwater on said rotor, said fairwater having converging sides terminating substantially at the axis of said shaft, and a port at the end of said fairwater in communication with said aperture in the shaft, said aperture being vented to the atmosphere.

13. In an hydraulic turbine, a rotor, a rotor shaft having an aperture extending axially thereof, means for delivering water to said rotor under pressure, a discharge conduit for carrying water away from said rotor, a conical fairwater on said rotor, a port at the apex of said conical fairwater, and a tube connecting said port with the aperture in said shaft.

14. In an hydraulic turbine, a rotor, a rotor shaft having an aperture extending axially thereof, means for delivering water to said rotor under pressure, a discharge conduit for carrying water away from said rotor, a conical fairwater on said rotor, a tube projecting through the apex of said fairwater and connected to the aperture in said shaft, and a cap on the projecting portion of said tube provided with a port leading into said discharge conduit.

ROGER V. TERRY.